(12) United States Patent
Spyrison et al.

(10) Patent No.: US 11,133,687 B2
(45) Date of Patent: Sep. 28, 2021

(54) WIRELESS CHARGING HOLSTER FOR PORTABLE ELECTRONIC DEVICE

(71) Applicant: TARGUS INTERNATIONAL LLC, Anaheim, CA (US)

(72) Inventors: Benjamin Nolan Spyrison, Los Angeles, CA (US); Alex Robert Cabunoc, Long Beach, CA (US); Jonny Yuan, Placentia, CA (US)

(73) Assignee: TARGUS INTERNATIONAL LLC, Anaheim, CA (US)

( * ) Notice: Subject to any disclaimer, the term of this patent is extended or adjusted under 35 U.S.C. 154(b) by 84 days.

(21) Appl. No.: 16/703,377

(22) Filed: Dec. 4, 2019

(65) Prior Publication Data

US 2020/0212694 A1 Jul. 2, 2020

Related U.S. Application Data

(60) Provisional application No. 62/775,205, filed on Dec. 4, 2018.

(51) Int. Cl.
| | |
|---|---|
| *H02J 50/00* | (2016.01) |
| *H02J 7/00* | (2006.01) |
| *H02J 7/02* | (2016.01) |
| *H02J 50/90* | (2016.01) |
| *H02J 50/10* | (2016.01) |

(52) U.S. Cl.
CPC ............ *H02J 7/0044* (2013.01); *H02J 7/02* (2013.01); *H02J 50/00* (2016.02); *H02J 50/005* (2020.01); *H02J 50/10* (2016.02); *H02J 50/90* (2016.02)

(58) Field of Classification Search
CPC .................................................. H02J 7/0045
USPC .......................................................... 320/114
See application file for complete search history.

(56) References Cited

U.S. PATENT DOCUMENTS

| | | | |
|---|---|---|---|
| 9,362,777 B2 | 6/2016 | Lau et al. | |
| 2008/0079388 A1 | 4/2008 | Sarnowsky | |
| 2010/0022285 A1* | 1/2010 | Randall | H01R 13/2421 455/573 |
| 2010/0312938 A1* | 12/2010 | Stampfli | H04B 1/3888 710/304 |
| 2012/0262117 A1 | 10/2012 | Ferber et al. | |
| 2013/0169069 A1 | 7/2013 | Stone et al. | |
| 2013/0214931 A1 | 8/2013 | Chia | |

(Continued)

FOREIGN PATENT DOCUMENTS

| | | |
|---|---|---|
| DE | 102016200482 | 7/2017 |
| KR | 20170075201 | 7/2017 |
| WO | 2016040781 A1 | 3/2016 |

OTHER PUBLICATIONS

PCT/US2019/064274, International Search Report and Written Opinion, dated Mar. 23, 2020, 10 pages.

*Primary Examiner* — Edward Tso
*Assistant Examiner* — Ahmed H Omar
(74) *Attorney, Agent, or Firm* — Stoel Rives LLP

(57) ABSTRACT

Wireless charging holsters for portable electronic devices (PEDs) are disclosed. A wireless charging holster may include a wireless charger and a holster frame. The holster frame may include a receptacle to integrate the wireless charger within the frame. The wireless charging holster may accept a PED in the proper positioning relative to the wireless charger to charge a battery of the PED without physically obstructing a space between a surface of the wireless charger and the PED.

20 Claims, 11 Drawing Sheets

(56) References Cited

U.S. PATENT DOCUMENTS

| | | |
|---|---|---|
| 2013/0257368 A1 | 10/2013 | Lau et al. |
| 2014/0000771 A1 | 1/2014 | Sherman et al. |
| 2014/0044281 A1 | 2/2014 | Ganem et al. |
| 2016/0134153 A1 | 5/2016 | Miller et al. |
| 2016/0190817 A1 | 6/2016 | Hartelt et al. |
| 2016/0285301 A1* | 9/2016 | Kim ............... H02J 7/0044 |
| 2016/0372973 A1* | 12/2016 | Fitzgerald ........ H02J 7/0042 |
| 2017/0016696 A1 | 1/2017 | Koskan et al. |
| 2017/0025889 A1 | 1/2017 | Ormesher et al. |
| 2017/0302099 A1 | 10/2017 | Bolden et al. |
| 2018/0055175 A1 | 3/2018 | Rho et al. |
| 2018/0062417 A1* | 3/2018 | Choi ............... H02J 7/0044 |

* cited by examiner

WIRELESS CHARGING HOLSTER FOR PORTABLE ELECTRONIC DEVICE

RELATED APPLICATIONS

This application claims priority to U.S. Provisional Patent Application No. 62/775,205, which was filed on Dec. 4, 2018 and his hereby incorporated by reference.

TECHNICAL FIELD

This disclosure generally relates to charging devices for portable electronic devices, and, more specifically, to wireless charging holsters for portable electronic devices.

DETAILED DESCRIPTION

Figure 1A:
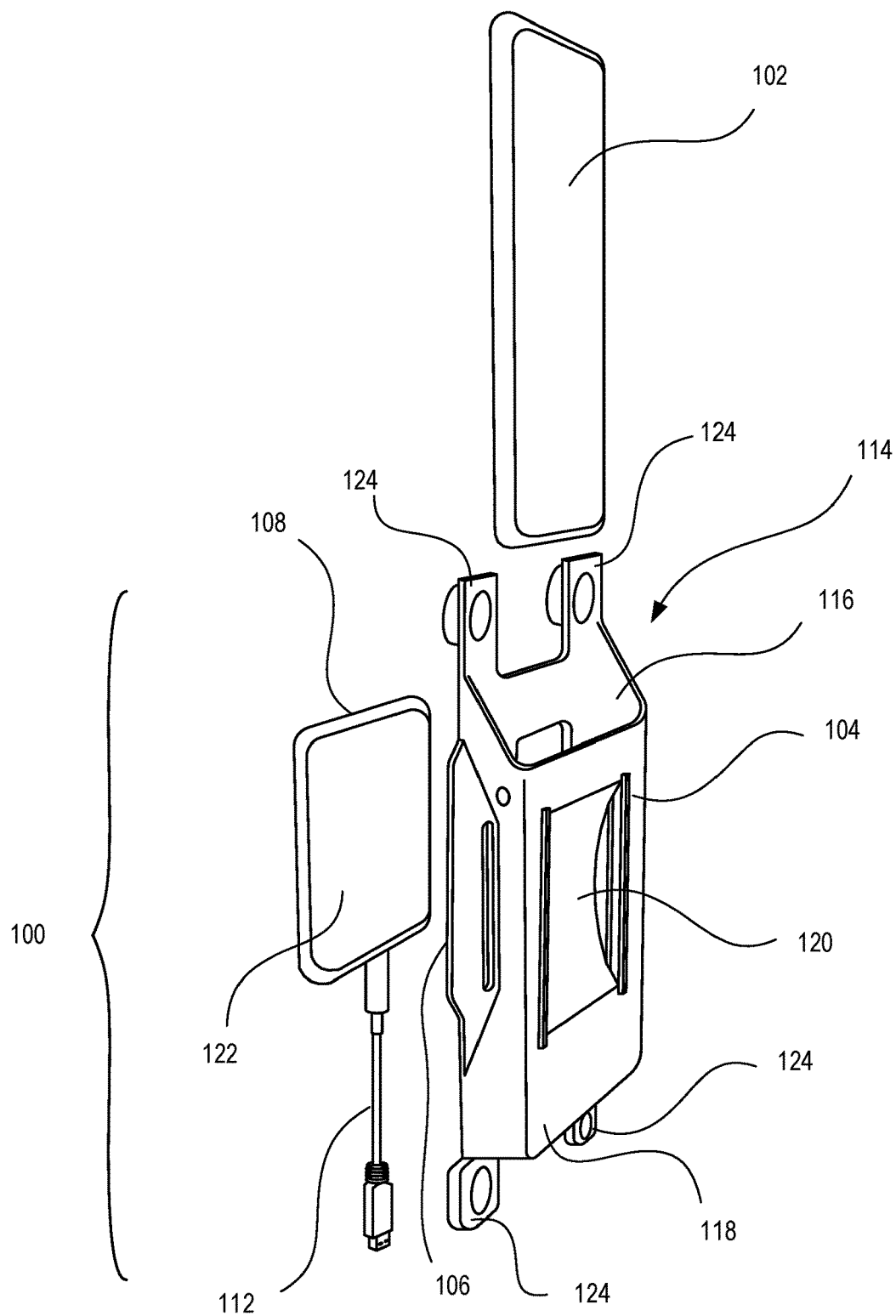
FIGS. 1A-1D illustrate views of a wireless charging holster and a portable electronic device (PED), according to an embodiment.
Figure 1B:
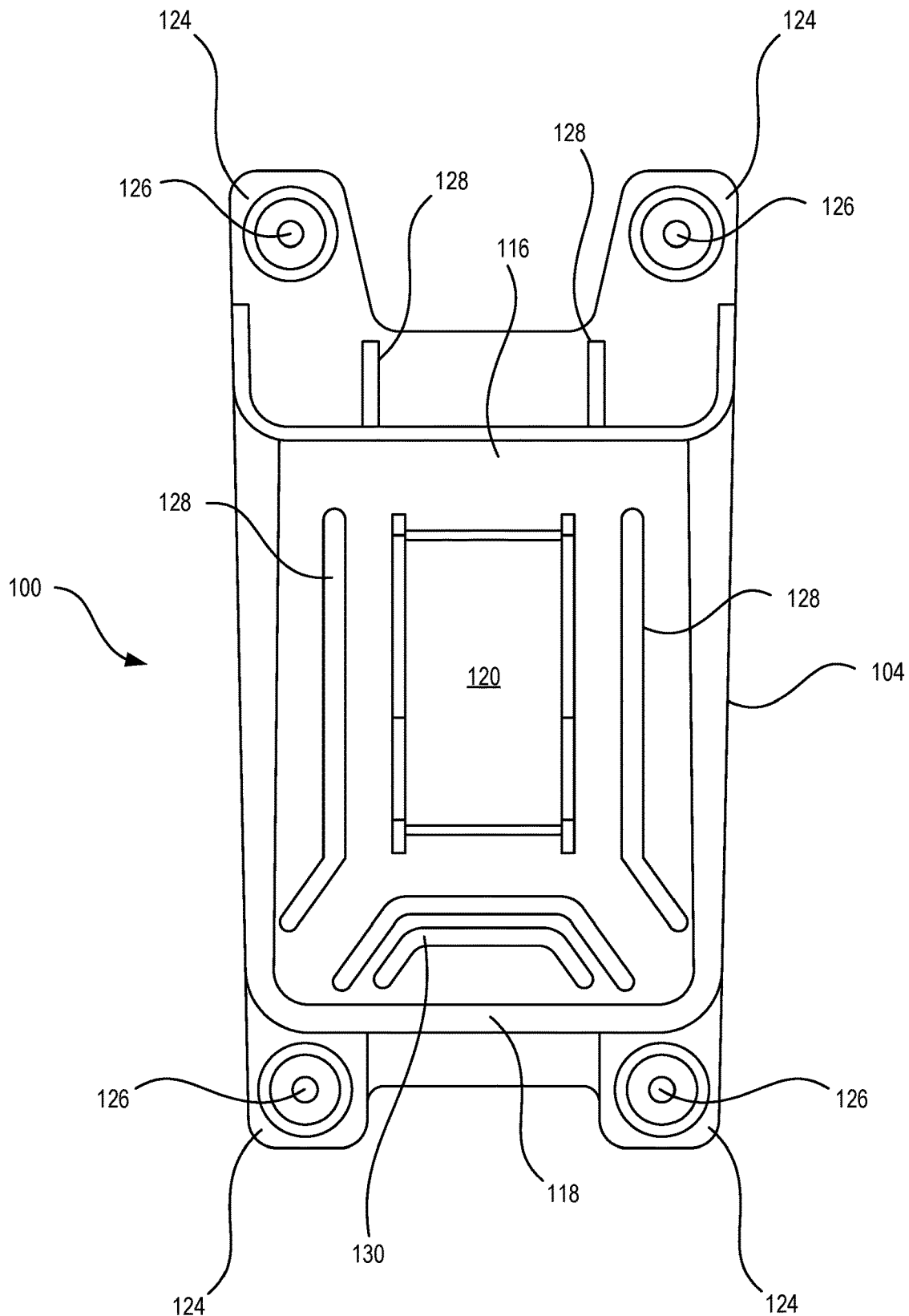
Figure 1C:
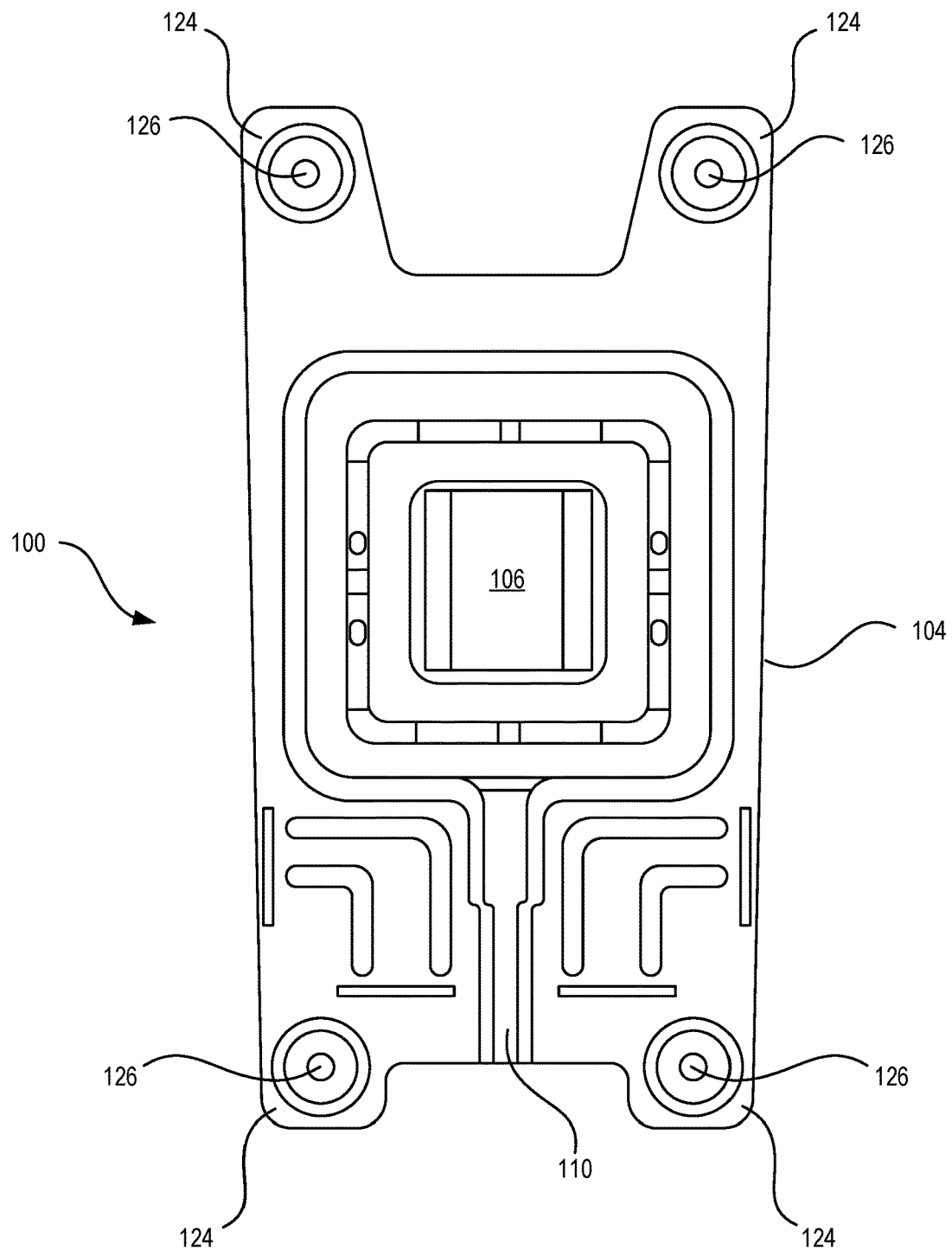
Figure 1D:
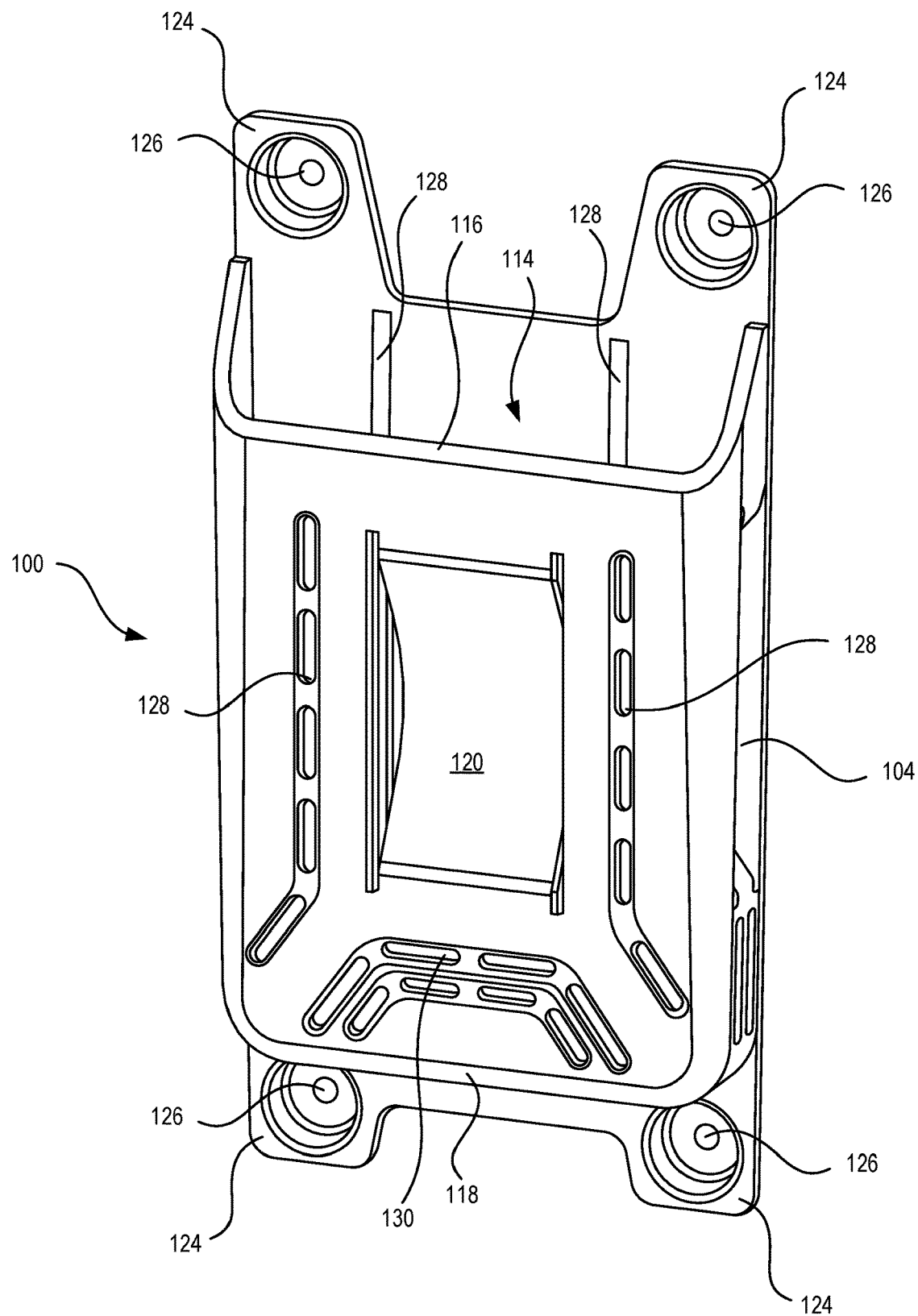

Portable electronic devices (PED), including smartphones, notebook computers, tablet computers, and portable digital assistants have become a mainstream part of modern life. In many cases, these PEDs include batteries from which they draw power in order to operate. This enables the portability of the PED by allowing a user to power (and therefore use) the PED in many diverse locations without being constrained only to locations that have an external power source immediately available for use with the PED. In order to enjoy this benefit, the battery of a PED must first be charged so that the PED has a power source to draw from during the time that it is being used away from an external power source.

Arranging for the battery of a PED to be properly charged can cause a user to expend valuable time and effort. For example, a user may be notified by the PED that the PED of a battery is almost discharged. This can occur in cases where the PED has been used between charges long enough to discharge the battery. In order to continue to use the PED, the user may thus be required to attach an appropriate charger for the battery of the PED to the PED. Because of the portable nature of the PED, this need may arise when the user is far away from the usual equipment with which the user typically charges the PED, meaning that the user must expend effort and/or other resources (e.g., money) to obtain another appropriate charger. Some PED chargers located during this search may not be of the correct type for the user's device. Even when an appropriate PED charger is located, it may be stationary, requiring the PED to remain in one location while it charges (thus removing the benefits of portability associated with the PED during that time).

Further, for some PED charging methods, a user must remember to attach or otherwise configure a PED charger to charge a corresponding PED. The user may not always remember to do so.

Advancements in battery charging technology now allow for a properly equipped PED to charge wirelessly. One such standard is the Qi standard, which uses inductive coupling principles to charge the battery of a properly equipped PED with a properly equipped wireless charger. By using induction, a Qi wireless charger may charge a PED configured to use the Qi standard without the need for a physical link between the wireless charger and the PED. In order to charge the PED, a Qi charger (or other wireless charger) may need to be in close enough proximity to the PED and in the proper position relative to the PED for the induction principle to operate between the devices. Other wireless charging methods and protocols (other than the methods and protocols used by Qi) are possible, and are contemplated as being within the scope of this disclosure.

Embodiments herein discuss the use of wireless charging holsters for use with PEDs. A wireless charging holster may operate with a wireless charger secured into a holster frame and a power cable for transporting power from a power source to the wireless charger. A wireless charging holster may be shaped or otherwise configured to accept a user's PED device. The wireless charger of the wireless charging holster may be configured to interact with and wirelessly charge the PED device when the device has been placed in the wireless charging holster. A wireless charging holster may be shaped such that an inserted PED is properly positioned to interact with the wireless charger of the wireless charging holster to charge the battery of the PED when the PED is inserted into the wireless charging holster. A wireless charging holster may be configured such that there is no physical barrier between the wireless charger and the PED when the PED is placed within the wireless charging holster. The use of a wireless charging holster may save the user the time that would normally be taken to attach a physical link to a power source to charge the PED, may save the user the effort needed to arrange a PED properly alongside a compatible wireless charger to charge, and may help assure the user that the PED is physically secure.

Further, the wireless charging holster may be attached to or otherwise used with a travel case, bag, backpack, briefcase, luggage, or the like (collectively referred to herein as "case") that is used in travel. The case may include a soft material, molded material, and/or waterproof/water resistant material. The case may include a battery, a power cable coupled to the battery, a wireless charger coupled to the power cable, and the wireless charging holster. This allows a user to charge a PED whenever the case is nearby and the battery is charged. The case may also include a power adapter and outlet cable to plug into an AC outlet and charge the battery and/or enable the wireless charger. The case may also include electronics to charge the battery through ambient motion as is well known in the art. The case may also include a suitable adapter to plug into a DC outlet such as a car cigarette lighter. Thus, the user has the ability to charge the PED in the holster when the battery is charged or when an outlet is available.

Embodiments may be best understood by reference to the drawings, wherein like parts are designated by like numerals throughout. It will be readily understood that the components of the present disclosure, as generally described and illustrated in the drawings herein, could be arranged and designed in a wide variety of different configurations. Thus, the following more detailed description of the embodiments of the systems, methods, and apparatuses is not intended to limit the scope of the disclosure, but is merely representative of possible embodiments of the disclosure. In some cases, well-known structures, materials, or operations are not shown or described in detail.

FIGS. 1A-1D illustrate views of a wireless charging holster 100 and a PED 102, according to an embodiment. The wireless charging holster 100 includes a holster frame 104 that may be formed as a unitary piece out of any one of various plastic materials. Thus, the holster frame 104 may be rigid with limited flexibility.

The holster frame 104 includes a receptacle 106 that is configured to receive and retain a wireless charger 108 into the holster frame 104. The receptacle 106 may retain the wireless charger 108 through a friction fit. The wireless charging holster 100 may further include a cable channel 110 in communication with the receptacle 106. The cable channel 110 receives a power cable 112 that is coupled to the wireless charger 108 to deliver power to the wireless charger 108 when attached to a power source.

When the power cable 112 is attached to an appropriate power source, the power cable 112 may deliver power from the power source to the wireless charger 108 such that the wireless charger 108 is energized and therefore capable of charging the PED 102. An appropriate power source may be a static power source, or it may be a portable power source that is easily carried by a user (e.g., in a case).

The wireless charging holster 100 may be configured to accept the PED 102 into a cavity 114 within the wireless charging holster 100. The wireless charging holster 100 may be shaped such that the PED 102 can be inserted into the cavity 114 in only one way, or only in one of a handful of possible ways. The wireless charging holster 100 may be shaped such that, once inserted into the cavity 114, the PED 102 is in a proper position to be charged by the wireless charger 108 of the wireless charging holster 100 when the wireless charger 108 is energized. In one embodiment, the wireless charging holster 100 may include an open end 116 that is in communication with the cavity 114 to receive the PED 102. The wireless charging holster 100 may further include a closed end 118 on an opposing side of the open end 116 to retain the PED 102 within the cavity 114.

The wireless charging holster 100 may be shaped such that the PED 102 is held securely within the wireless charging holster 100. For example, the wireless charging holster 100 may be sized such that when a PED 102 is placed in the wireless charging holster 100, friction between the PED 102 and the wireless charging holster 100 acts to hold the PED 102 in place within the wireless charging holster 100. The wireless charging holster 100 may include a retention member 120 which may be integrated with the wireless charging holster 100 and formed of the same plastic material. The retention member 120 may be configured to curve into the cavity 114 and engage a surface of the PED 102 and thereby retain the PED 102 by friction. As illustrated, the retention member 120 and the receptacle 106 may be located on opposing sides of the holster frame 104.

The holster frame 104 of the wireless charging holster 100 may position the wireless charger 108 such that a front surface 122 of the wireless charger 108 is directly adjacent to the cavity 114 of the wireless charging holster 100 into which the PED 102 may be inserted, with no intervening physical structure obstructing the space between the cavity 114 and the adjacent front surface 122 of the wireless charger 108. The positioning of this front surface 122 of the wireless charger 108 may allow the wireless charger 108 to wirelessly charge the PED 102 without physical obstruction.

The wireless charging holster 100 may further include one or more standoffs or extensions 124 extending from the holster frame 104. Each standoff may be configured to enable attachment of wireless charging holster 100 to a case. The standoffs 124 may provide a mounting location for (or be specially shaped to act as) snap rivets (or snap grommets) that can be paired with snap grommets (or snap rivets) on a carried item in order to removably attach the wireless charging holster 100 to the carried item. The standoffs 124 may instead be used as a mounting location for other types of connectors, such as a hook connector or a loop connector for a hook and loop attachment method, or any other connectors for any other attachment method suitable to attach the connector to the item. In the illustrated embodiment, each standoff includes a well 126 to receive a connector such as a rivet or grommet.

The holster frame 104 may further include one or more side rails 128 to assist in guiding and retaining the PED 102 within the cavity 114. Side rails 128 may be disposed on opposing interior surfaces of the holster frame 104. The holster frame 104 may also include one or more bottom rails 130 in proximity to the closed end 118. The rails 128, 130 may extend into the cavity 114 and position the PED 102 in a specific location to optimize charging.

Other embodiments that do not use standoffs 124 to attach the wireless charging holster 100 to the carried item are contemplated. For example, a wireless charging holster 100 may be sewn into a panel of the case.

Figure 2:
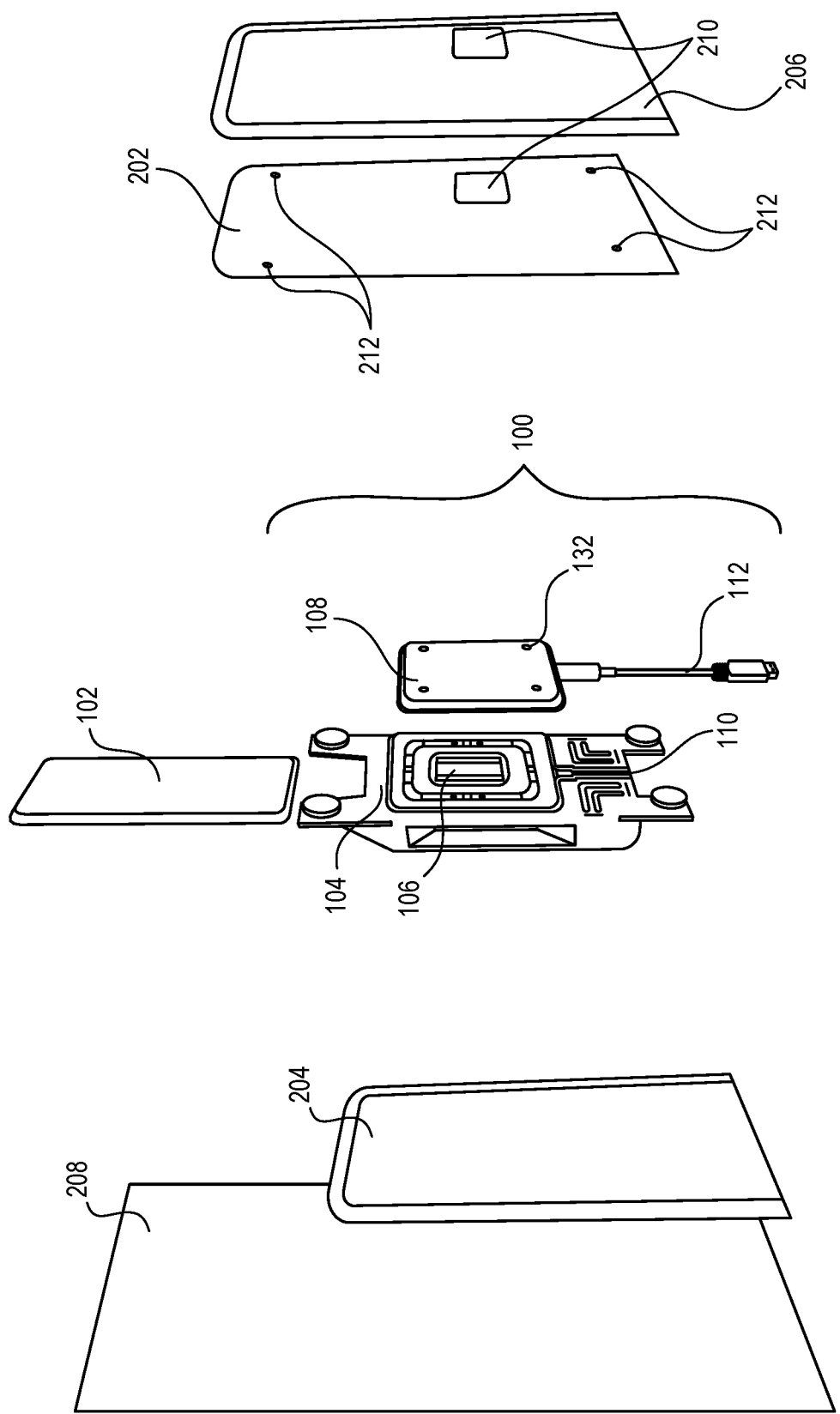
FIG. 2 illustrates an exploded view of a wireless charging holster and a PED positioned between elements of a case that is attached to the charging holster, according to an embodiment.

FIG. 2 illustrates a back exploded view of a wireless charging holster 100 and a PED 102 positioned between segments 202-208 of a case that is attached to the charging holster, according to an embodiment. Wireless charging holster 100 may be the same design as the wireless charging holster of FIG. 1. From this back view of the wireless charging holster 100, the cable channel 110 is shown, which may be used by the power cable 112 to route through the holster frame 104 and physically attach to the wireless charger 108.

Also as seen in this back view is the receptacle 106 in the holster frame 104 configured to integrate the wireless charger 108 into the holster frame 104 such that a front surface 122 of the wireless charger 108 is adjacent to the cavity 114 of the wireless charging holster 100. In the present embodiment, the receptacle 106 is configured to hold the wireless charger 108 in place by the edges, leaving the space between the front surface 122 of the wireless charger 108 facing the cavity 114 and a PED 102 inserted into the cavity 114 unobstructed in the manner described above. The receptacle 106 may also be configured to allow a light 132 positioned on a back surface of the wireless charger 108 to shine unobstructed in a direction away from the wireless charging holster 100. This light 132 may be configured to light up when the wireless charger 108 is powered and/or when the wireless charger 108 is actively charging a PED (e.g., PED 102).

FIG. 2 further illustrates a possible positioning of the wireless charging holster 100 when placed within or attached to an item carried by the user (such as in the pocket of a case carried by the user). One or more portions of a case may be comprised of one or more segments 202-208. A case with a pocket may include a first interior lining segment 202 and a second interior lining segment 204. The pocket of the case may further include a pocket cover exterior segment 206 and a case chassis segment 208. The wireless charging holster 100 may be placed within the pocket such that when the pocket is collapsed the wireless charging holster 100 is abutted by the first interior lining segment 202 and the pocket cover exterior segment 206 on one side and the second interior lining segment 204 and the case chassis segment 208 on the other side. Multiple charging indicator portholes 210 may be located in, respectively, the first interior lining segment 202 and the pocket cover exterior segment 206. The charging indicator portholes 210 may be mesh segments of the first interior lining segment 202 and the pocket cover exterior segment 206, or they may simply be holes in the first interior lining segment 202 and the pocket cover exterior segment 206. The charging indicator portholes 210 may allow a user to view the light 132 through, e.g., the first interior lining segment 202 and the pocket cover exterior segment 206. This may allow a user to monitor the light 132 without opening, e.g., a pocket on the case that holds the wireless charging holster 100.

In some embodiments, one or more mating pairs of connection hardware (e.g., a paring comprising a snap rivet and a snap grommet or a paring comprising a hook surface and a loop surface, not shown) may have one of their pieces attached to one of the standoffs 124 of the wireless charging holster 100 and at corresponding location(s) 212 on or through the first interior lining segment 202. A piece of a mating pair that passes through a segment may be, e.g., a snap rivet or snap grommet with a portion that passes through an opening in a segment and a portion that clamps down on or otherwise attaches to the sides of the segment adjacent to the opening. The mating pair(s) of connection hardware may then be physically paired in order to removably attach the wireless charging holster 100 to the first interior lining segment 202 of the case at a predetermined location.

Similarly, pieces of the connection hardware mating pairs may instead be attached at the standoffs 124 and on or through one or more of the pocket cover exterior segment 206, the second interior lining segment 204, and the case chassis segment 208 (with access holes formed into intervening segments as necessary) in order to removably attach the wireless charging holster 100 to those respective segment(s) of the pocket at a predetermined location.

There are many possible benefits to be gained when the wireless charging holster 100 is placed within or attached to an item carried by the user (such as in the pocket of the case as discussed above). The placement of the wireless charging holster 100 in a case (or other item) that is normally carried by the user provides the user with access to charging equipment for the PED 102 so long as the user also takes along the case. Further, if a portable power supply (e.g., a battery) is carried in the case and used in connection to the wireless charger 108 of the wireless charging holster 100 via a power cable 112 of the wireless charging holster 100, a user can power the wireless charger 108 of the wireless charging holster 100 without needing to otherwise locate an outside power source for the wireless charger 108. In cases using a separate portable power source, a user's need to remember to charge the PED 102 may be lessened to the extent that the user makes a habit of placing the PED 102 in the wireless charging holster 100 in the case (or other item) while the wireless charger 108 is attached to and energized by the portable power supply.

Figure 3:
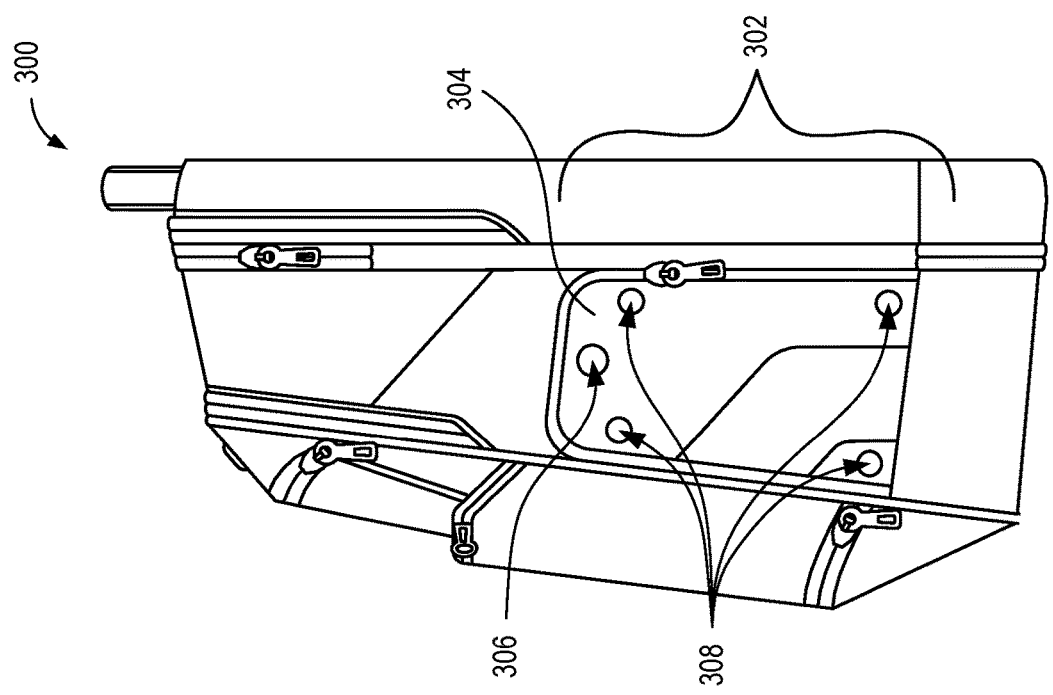
FIG. 3 illustrates multiple views of a case that is configured to integrate a wireless charging holster into a pocket of the case, according to an embodiment.
Figure 3:
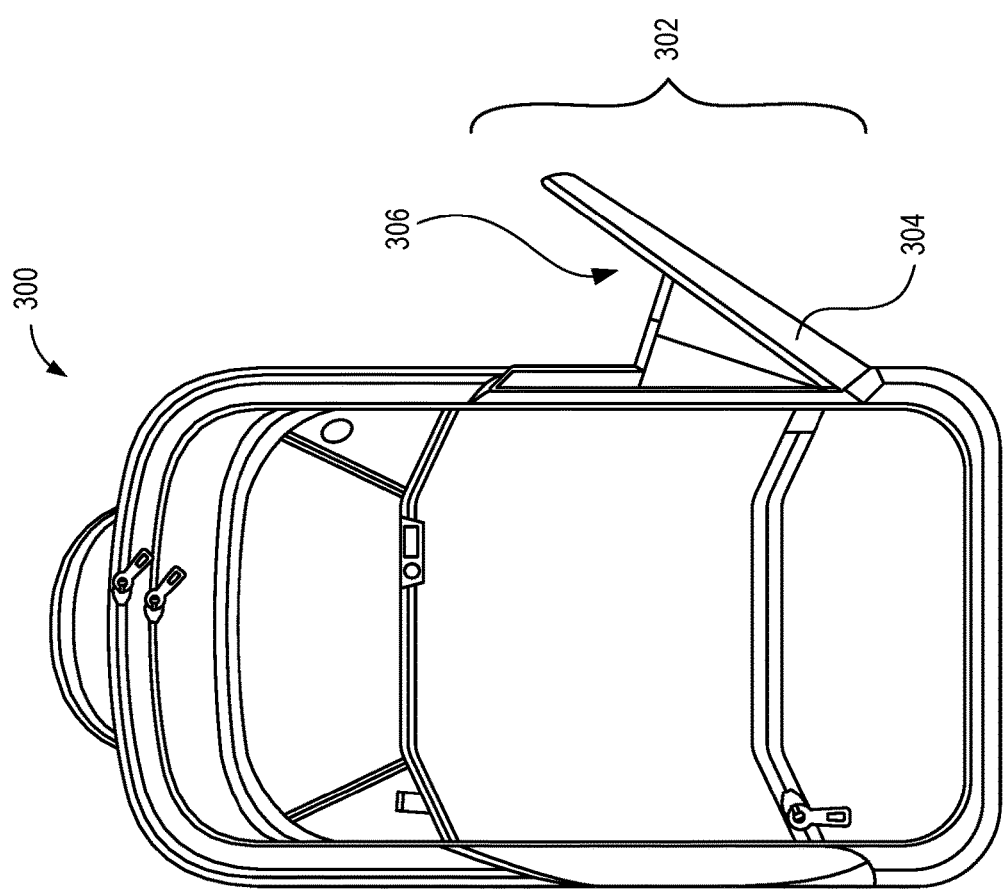

FIG. 3 illustrates multiple views of a case 300 that is configured to integrate a wireless charging holster 100 into a pocket 302 of the case, according to an embodiment. The pocket 302 may have a pocket flap 304 configured to attach to a wireless charging holster 100. The pocket flap 304 may further include a headphone pass-through 306.

The pocket flap 304 may attach to the wireless charging holster 100 using mating pairs of connection hardware, with one component of the one or more mating pairs attached to the wireless charging holster 100 and the other component of the one or more pairs attached to one or more segments of the pocket flap 304. The components of the mating pairs of the connection hardware may be placed on standoffs 124 of a wireless charging holster 100 and attached on or through one or more segments of the pocket flap 304, similar to the manner described in relation to FIG. 2. The component of the mating pairs of connection hardware attached to segment(s) of the pocket flap 304 may be placed at the indicated points 308 of the pocket flap 304, facing inward and exposed on the inside of the pocket flap 304. The attachment of the wireless charging holster 100 to the components of the mating pairs at the indicated points 308 may then occur on the inside of the pocket flap 304.

Components of the mating pairs of connection hardware attached on or through segments of the pocket flap 304 may be hidden under the exterior material of the pocket flap 304 such that they are not visible from the outside of the pocket flap 304. Alternatively, the components of the mating pairs of connection hardware that are attached to the pocket flap 304 may be visible on the outside of the pocket flap (e.g., when a component of a mating pair attaches through the exterior segment of pocket flap 304).

Figure 4:
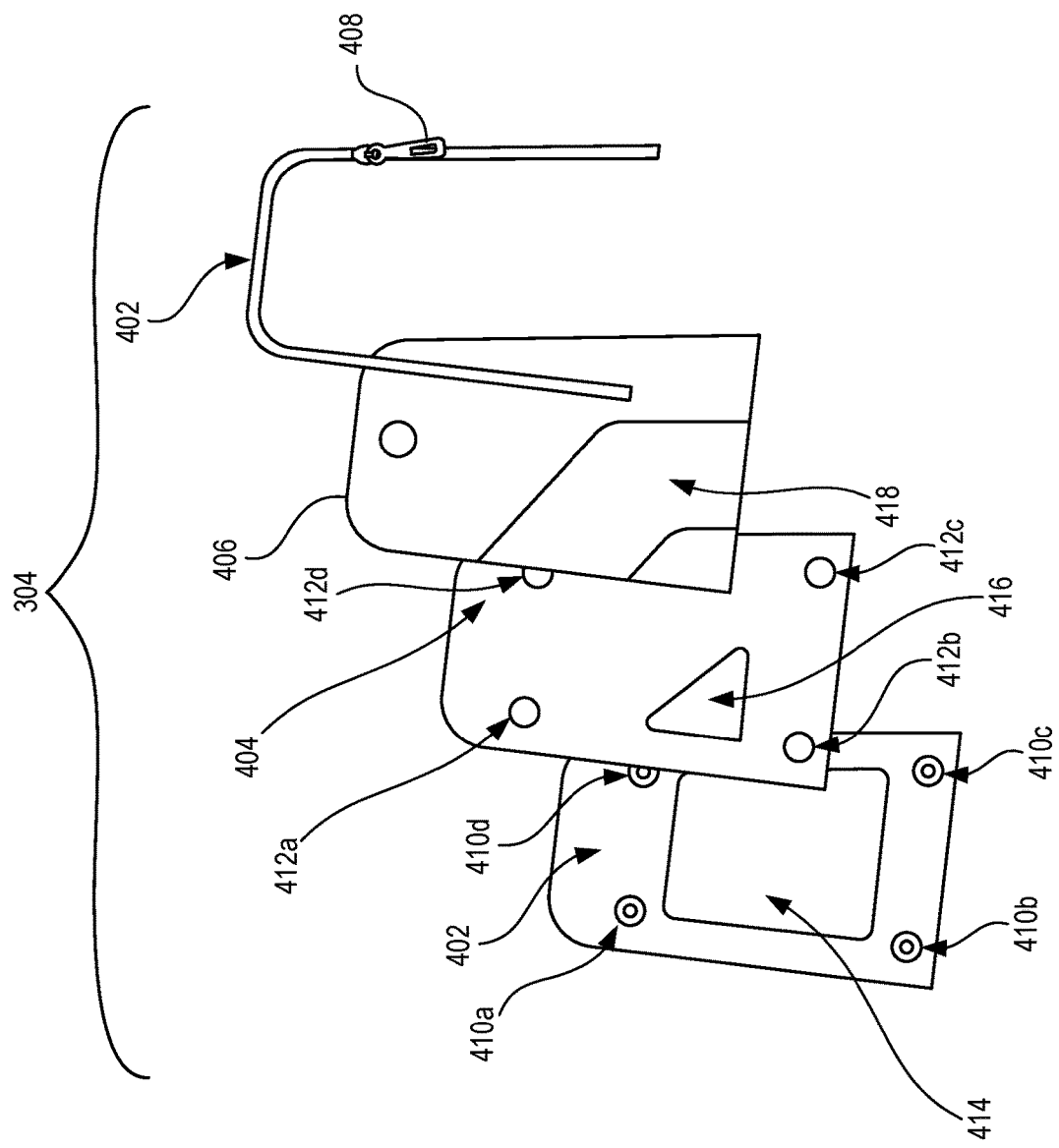
FIG. 4 illustrates an exploded view of a pocket flap of a case that has been configured for the attachment of a wireless charging holster using snap hardware, according to an embodiment.

FIG. 4 illustrates an exploded view of the pocket flap 304 of a case that has been configured for the attachment of a wireless charging holster 100 using snap hardware, according to an embodiment. The pocket flap 304 may be comprised of a lining material segment 402, a foam sheet padding segment 404, a coated exterior material segment 406, and a zipper 408. A snap grommet may be attached through the lining material segment 402 and the foam sheet padding segment 404 at locations 410a-d of the lining material segment 402 and at the locations 412a-d of the foam sheet padding segment 404.

The lining material segment 402, the foam sheet padding segment 404, the coated exterior material segment 406, and the zipper 408 may then all be sewn or otherwise attached together in order to form the pocket flap 304, leaving the snap grommets exposed on the external surface of the lining material segment 402 of the pocket flap 304. A wireless charging holster 100 using, e.g., appropriately sized and spaced snap rivets placed on standoffs 124 would then be attached to the snap grommets of pocket flap 304.

The lining material segment 402 may include a first porthole 414 that is a piece of mesh cloth integrated into the lining material segment 402. The foam sheet padding segment 404 may include a second porthole 416 that is simply a hole in the foam sheet padding segment 404. The coated exterior material segment 406 may include a third porthole 418 that is a piece of mesh cloth integrated into the coated exterior material segment 406. When the segments 402, 404, and 406 are sewn (or otherwise attached) together, these portholes 410-418 may align such that a light on a wireless charger of the wireless charging holster attached to the pocket flap 304 in the manner discussed above is visible even when the pocket 302 is closed.

Although FIG. 4 illustrates a side pocket, one of skill in the art will appreciate that the wireless charging holster may be located in any exterior or interior pocket of a case. Indeed, the wireless charging holster may be secured to a panel of a case. For example, a user may open a main case compartment and access a wireless charging holster secured to an interior panel of the main case compartment.

Figure 5:
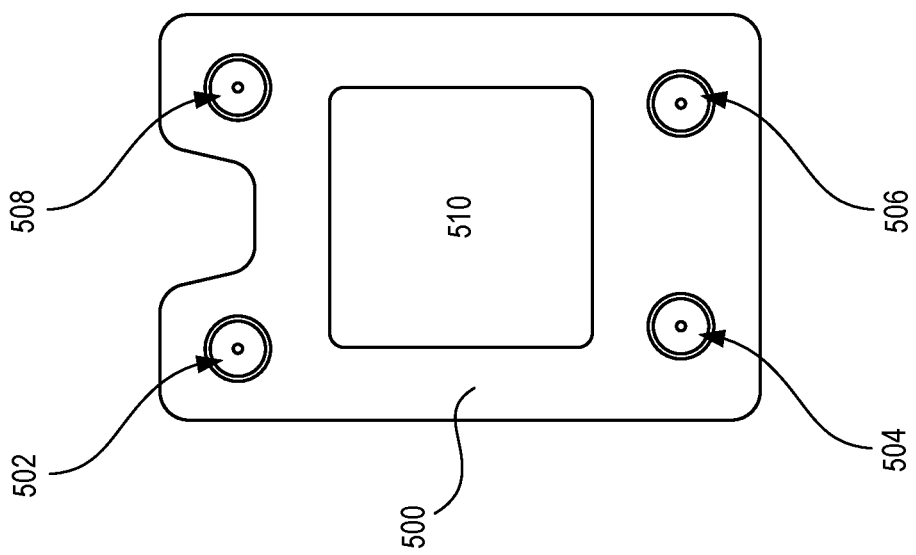
FIG. 5 illustrates various views of a holster frame with recessed standoffs for attaching snap hardware thereto, according to an embodiment.

FIG. 5 illustrates various views of a front portion 500 of a holster frame with recessed standoffs 502-508 for attaching connection hardware thereto, according to an embodiment. Front portion 500 of a holster frame may further be configured with a receptacle 510 for a wireless charger of a wireless charging holster.

Figure 6:
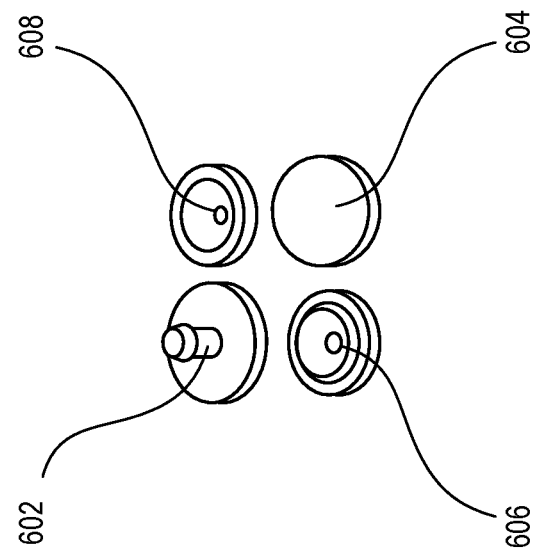
FIG. 6 illustrates various components of snap grommets and snap rivets that may be attached to a holster frame, according to some embodiments.

FIG. 6 illustrates various components 602-608 of snap grommets and snap rivets that may be attached to a holster frame, according to an embodiment. A first snap rivet component 602 may pair with a second snap rivet component 604 in the manner described above to pass through one or more segments of a case or other item carried by a user, making the snap rivet available to a snap grommet attached to a standoff on a wireless charging holster. Alternatively, the first snap rivet component 602 and the second snap rivet component 604 may be paired with and then attached to a standoff on a wireless charging holster to be available to a snap grommet available on or through one or more segments of, e.g., a pocket of an item carried by a user.

A first snap grommet component 606 may pair with a second snap grommet component 608 in the manner described above to pass through one or more segments of a case or other item carried by a user, making the snap grommet available to a snap rivet attached to a standoff on a wireless charging holster. Alternatively, the first snap grommet component 606 and the second snap grommet component 608 may be paired with and then attached to a standoff on a wireless charging holster to be available to a snap rivet available on or through one or more segments of, e.g., a pocket of a case.

Figure 7:
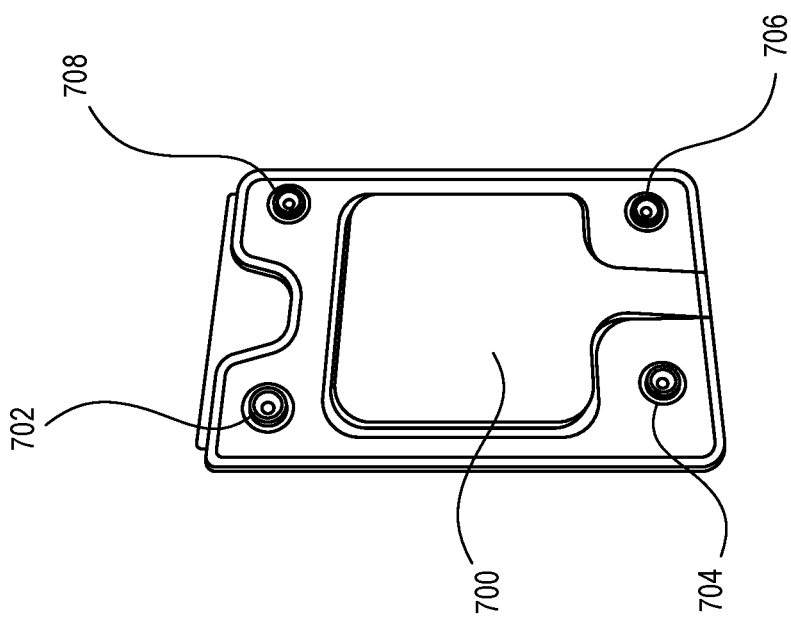
FIG. 7 illustrates a holster frame with attached snap grommets, according to an embodiment.

FIG. 7 illustrates an embodiment of a holster frame 700 with attached snap grommets 702-708, according to an embodiment.

Figure 8:
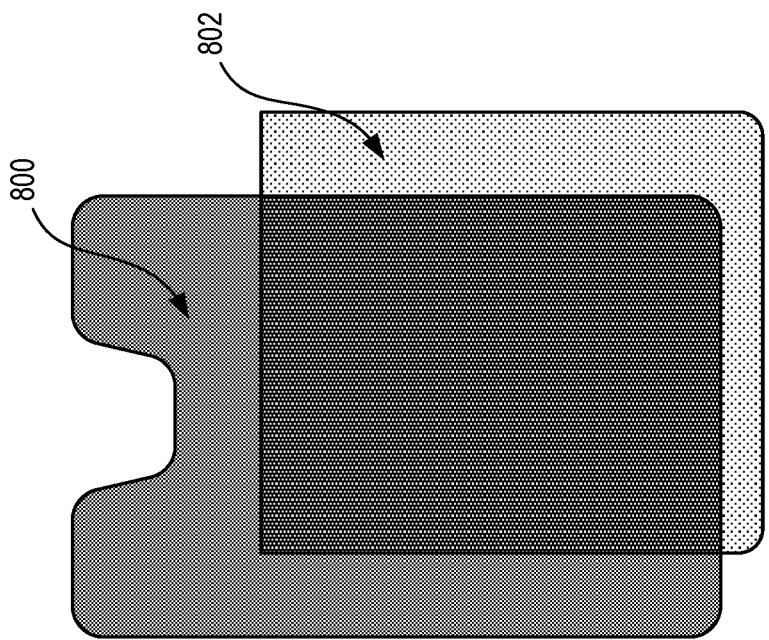
FIG. 8 illustrates a shaped lining and a mesh material that may be used when mounting the charging holster on another item according to an embodiment.

FIG. 8 illustrates a shaped lining 800 and an elastic mesh 802 that may be used in conjunction with a wireless charging holster. In some embodiments, the shaped lining 800 may match the shape of an interior surface of a wireless charging holster (adjacent to a cavity of the wireless charging holster) and may be placed along the interior surface of a wireless charging holster in order to prevent a PED that is inserted into the cavity from becoming scratched by its interaction with the interior surface of the wireless charging holster. This shaped lining may include a hole (not shown) when being placed on an interior surface of a wireless charging holster that includes a wireless charger in a receptacle configured to leave unobstructed space between a front surface of the wireless charger facing the cavity and a PED inserted into the cavity (e.g., the hole may be placed in such a way that shaped lining 800 covers the holster frame portion of the surface but not the wireless charger portion of the surface). The elastic mesh 802 is presented as one type of material that may be used in one or more segments of a pocket (or other portion) of an item carried by the user.

Figure 9:
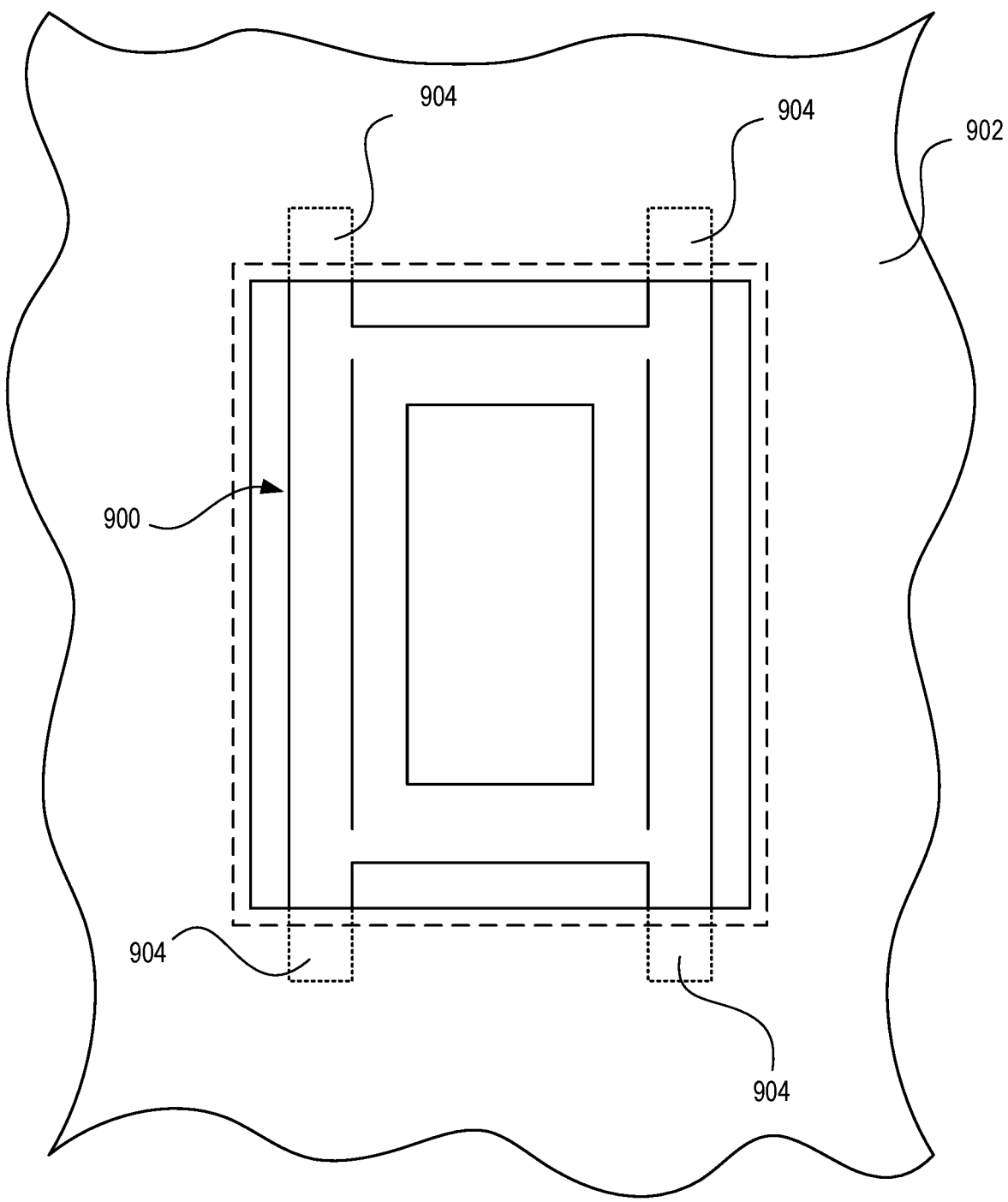
FIG. 9 illustrates an embodiment of a wireless charging holster secured within a case panel.

FIG. 9 illustrates an embodiment wherein a wireless charging holster 900 is sewn into a panel 902 of a case. The wireless charging holster 900 may be similarly embodied as disclosed above. The charging holster 900 may include one or more extensions 904 that extend between fabric layers of the panel 902. The fabric layers may be sewn together to thereby secure the position of the wireless charging holster 900. As can be appreciated, the extensions 904 may be configured in various shapes to secure the position of the wireless charging holster 900. The charging holster 900 may be secured into a case pocket or into any interior panel or even an exterior panel.

Figure 10:
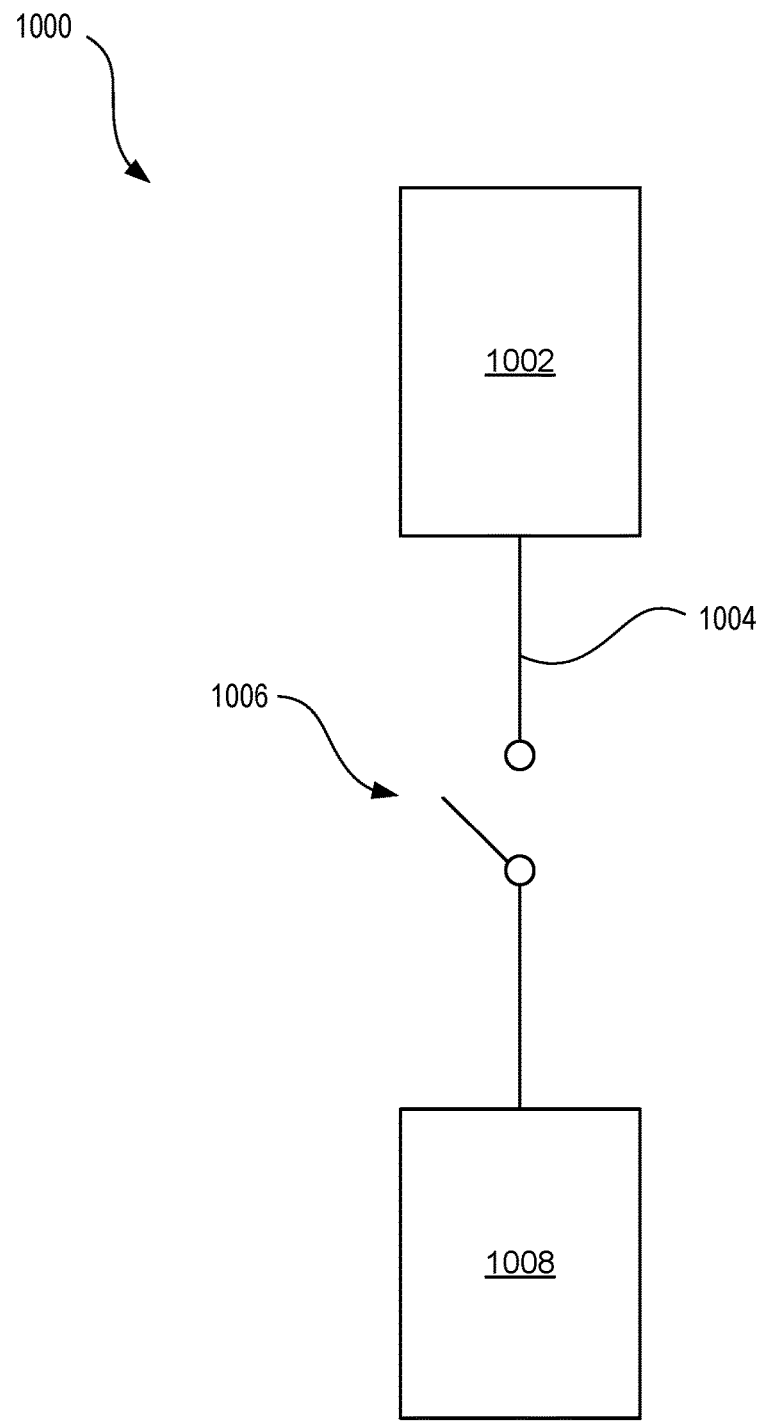
FIG. 10 illustrates an embodiment of a schematic for a wireless charger and an associated light.

FIG. 10 illustrates a schematic 1000 of the wireless charger 1002 that is in electrical communication with a contact 1004, a switch 1006, and the light 1008. As explained previously, a light 132/1008 may be positioned on a surface of the wireless charger 108/1002. The light 132/1008 is powered via the switch 1006 when the wireless charger 108/1002 is actively charging a PED 102.

In the various embodiments disclosed herein, the wireless charging holster may securely fix the wireless charger and the PED in proximity without any material or obstruction between. Alternatively, the wireless charging holster may include a material disposed adjacent the receptacle and disposed between the wireless charger and the PED. The intervening material is selected so as not to interfere with the PED charging.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be determined by the following claims.

The invention claimed is:

1. A portable case to receive a portable electronic device, comprising:
   a plurality of storage compartments;
   a pocket attached to the portable case, the pocket including a pocket opening and an interior panel;
   a wireless charger;
   a wireless charging holster secured to the interior panel of the pocket and including,
      a rigid holster frame, including a first side to cover a majority of a display side of the portable electronic device and a second side to cover a majority of a back side of the portable electronic device,
      a cavity to receive the portable electronic device,
      an open end aligned with the pocket opening and in communication with the cavity to receive the portable electronic device, and
      a receptacle to receive the wireless charger, wherein the cavity and the receptacle position the portable electronic device and the wireless charger in proximity to one another to enable the wireless charger to charge the portable electronic device.

2. The portable case of claim 1, wherein the holster frame is formed of a single material and the holster frame defines the cavity and the receptacle.

3. The portable case of claim 1, wherein the wireless charging holster includes a cable channel in communication with the receptacle to receive a power cable.

4. The portable case of claim 1, wherein the wireless charging holster includes a retention member that at least partially extends into the cavity to engage the portable electronic device.

5. The portable case of claim 1, wherein the wireless charging holster includes an extension configured to engage with the interior panel.

6. The portable case of claim 5, wherein the extension includes a grommet configured to removably engage with the interior panel.

7. The portable case of claim 5, wherein the interior panel includes fabric layers and the extension extends between the layers.

8. The portable case of claim 1, wherein the wireless charging holster includes an inner material disposed within the cavity to reduce wear on the portable electronic device.

9. The portable case of claim 1, wherein the interior panel includes a porthole to enable viewing of the wireless charger through the interior panel.

10. A portable case to receive a portable electronic device, comprising:
a plurality of storage compartments;
a pocket attached to the portable case, the pocket including a pocket opening and an interior panel;
a wireless charger; and
a wireless charging holster secured to the interior panel of the pocket and including,
a rigid holster frame, including a first side to cover a majority of a display side of the portable electronic device and a second side to cover a majority of a back side of the portable electronic device,
a plurality of standoffs configured to engage with the interior panel,
a cavity to receive the portable electronic device,
an open end aligned with the pocket opening and in communication with the cavity to receive the portable electronic device, and
a receptacle to receive the wireless charger and retain the wireless charger by frictional engagement,
wherein the cavity and receptacle position the portable electronic device and the wireless charger in proximity to one another to enable unobstructed wireless charging of the portable electronic device.

11. The portable case of claim 10, wherein the wireless charging holster includes four standoffs and each standoff includes a corresponding grommet to removably couple with the interior panel.

12. The portable case of claim 10, wherein the holster frame is formed of a single material and the holster frame defines the cavity and the receptacle.

13. The portable case of claim 10, wherein the wireless charging holster includes a cable channel defined by the holster frame and in communication with the receptacle to receive a power cable.

14. The portable case of claim 10, wherein the wireless charging holster includes a retention member that at least partially extends into the cavity to engage the portable electronic device.

15. The portable case of claim 10, wherein the interior panel includes fabric layers and the standoffs extend between the layers.

16. The portable case of claim 10, wherein the wireless charging holster includes an inner material disposed within the cavity to reduce wear on the portable electronic device.

17. The portable case of claim 10, wherein the interior panel includes a porthole to enable viewing of the wireless charger through the interior panel.

18. A wireless charging holster to receive a wireless charger and a portable electronic device, comprising:
a rigid holster frame including,
a first side to cover a majority of a display side of the portable electronic device,
a second side to cover a majority of a back side of the portable electronic device,
a cavity to receive the portable electronic device,
an open end in communication with the cavity to receive the portable electronic device and
a receptacle to receive the wireless charger and retain the wireless charger by frictional engagement,
wherein the cavity and receptacle position the portable electronic device and the wireless charger in proximity to one another to enable unobstructed wireless charging of the portable electronic device; and
a plurality of standoffs extending from the holster frame, wherein each standoff includes,
a mounting location, and
a connector coupled to the mounting location and configured to extend through and connect to a fabric panel of a travel case.

19. The portable case of claim 1, further comprising a power source, separate from the portable electronic device, and in communication with the wireless charger.

20. The portable case of claim 10, further comprising a power source, separate from the portable electronic device, and in communication with the wireless charger.

* * * * *